United States Patent [19]

Foster et al.

[11] Patent Number: 5,290,127
[45] Date of Patent: Mar. 1, 1994

[54] SUBSEA CONDUIT SUPPORT APPARATUS AND METHOD

[75] Inventors: William S. Foster, The Woodlands; Craig W. Fitzgerald, Spring, both of Tex.; Peter W. Bryce, Delta, Canada

[73] Assignee: Intec Engineering, Inc., Houston, Tex.

[21] Appl. No.: 831,863

[22] Filed: Feb. 5, 1992

[51] Int. Cl.$^5$ .............................................. F16L 1/12
[52] U.S. Cl. ............................. 405/172; 405/158; 405/154; 248/49
[58] Field of Search ..................... 405/154, 158, 172; 248/49, 70, 157, 188.5

[56] References Cited

U.S. PATENT DOCUMENTS

| 4,252,466 | 2/1981 | Berti et al. | 405/172 |
|---|---|---|---|
| 4,265,566 | 5/1981 | Scodino | 405/172 |
| 4,494,893 | 1/1985 | Migliavacca | 405/172 |
| 4,784,527 | 11/1988 | Hunter et al. | 405/207 |

FOREIGN PATENT DOCUMENTS 1592624  9/1990  U.S.S.R. ................ 248/49

Primary Examiner—Randolph A. Reese
Assistant Examiner—J. Russell McBee
Attorney, Agent, or Firm—Jackson & Walker

[57] ABSTRACT

A subsea conduit support apparatus including a frame having a plurality of legs extending to a seabed for supporting the frame. The legs are selectively moveable to position the frame member relative to the contour of the seabed. A clamp or ring is carried by the frame to hold the conduit within the apparatus and may be allowed to rotate within the frame, so that undulations or irregularities in the seabed do not affect a substantially horizontal or other selected continuous positioning of the conduit relative to the seabed.

4 Claims, 3 Drawing Sheets

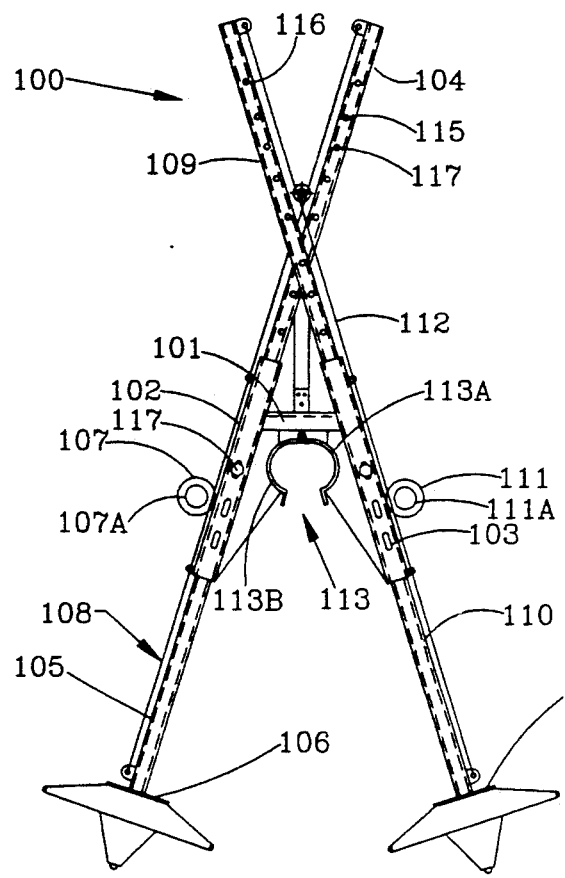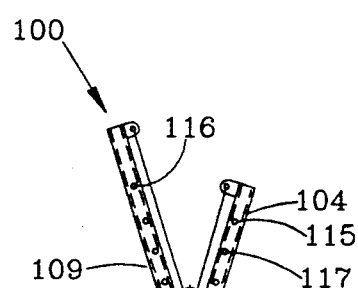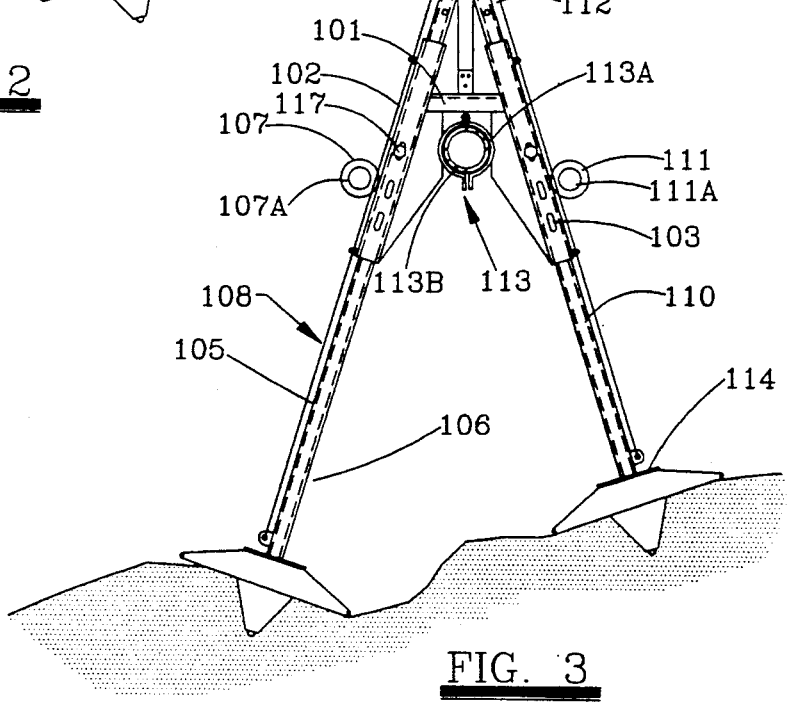
FIG. 2
FIG. 3

SUBSEA CONDUIT SUPPORT APPARATUS AND METHOD

BACKGROUND OF THE INVENTION (1) Field of the Invention

The invention relates to a seabed conduit support apparatus for the proper installation of, for example, a subsea gas transmission conduit.

(2) Brief Description of the Prior Art

There are many instances in which it is desirable to place a fluid transmitting cylindrical conduit across a portion of a river, stream, ocean or other comparatively large or deep body of water. Such conduits are typically utilized to carry hydrocarbons such as oil or gas, or other fluids.

Such conduits are typically layed on the seabed and extend for many miles. Some such conduits systems have been placed in extreme water depths up to 2000 feet, and in the future will be installed in even greater depths. In certain cases, the seabed contours may not be uniform enough to provide continuous support for a long pipeline. The seabed will typically be uneven, with considerable undulations and irregularities in the seabed structure being frequently found in the area across which a conduit is to be placed. Free spans of such conduits or pipelines will occur where the conduit or pipeline crosses such undulations or irregularities in the seabed.

The flow of bottom currents past a free span may, in turn, cause unsteady flow patterns around the pipeline due to vortex shedding. If the vortex shedding frequency coincides with the natural frequency of the pipeline free span, in-phase or harmonic oscillations will occur. The dynamic stresses caused by these pipe oscillations can result in long term fatigue of the pipeline or conduit parent metal and its welds which, in turn, can substantially reduce operating life of the conduit or pipeline. This problem can be remedied by providing intermediate support to the pipe thereby reducing the unsupported span length.

In the past, the unevenness in the seabed was commonly adjusted for or compensated by the selective placement of cement bags or grout pillows under the pipe. In the case of grout pillows, a rubber-like bladder is positioned in the undulation by a diver, and liquid cement is pumped into the bladder through a hose connected to the bladder and extending to a pumping barge or boat or other element at the surface.

While such approaches have been beneficial in comparatively shallow environments, i.e. depths of 500 feet or less, it has been found to be impractical to incorporate such methods in deeper waters because of the difficulty and lack of safety in using divers at such increased depths. Moreover, special measures are required when using such techniques where variations in slopes on the seabed are encountered.

The present invention addresses the deficiencies of the prior art, as described.

SUMMARY OF THE INVENTION

The present invention provides the subsea conduit support apparatus and method. The apparatus comprises a frame member having a plurality of legs which extend to the seabed for supporting the frame member and having leg members selectively moveable to position the frame member relative to the contour of the seabed. Means are carried by the frame member for holding the conduit within the apparatus. In a preferred embodiment, the leg members comprise first and second selectively expandable and retractable telescopically housed elements. Additionally, in a preferred embodiment, the leg members have anchoring pod means secured to one end thereof for stabilizing placement of the leg members onto the seabed. Activating means carried by the leg members are provided for selective telescopic movements between the first and second elements. The activating means may comprise a cable secured to each end of the leg members, with the cable passing around a drum. The drum is rotatable by a winch whereby the drum is rotated and the cable moved to expand or retract the leg members.

In lieu of a cable and winch system, the leg members may include a screw jack mechanism which is responsive to hydraulic activation. Upon activation of a hydraulic wrench a threaded rod is turned inside a nut fastened to the second leg member causing the first and second leg member to move relative to one another.

The apparatus also includes means for holding the conduit. Preferably, such holding means comprises first and second ring members which are biased to opened position and self closes when it is placed on the pipe, as the weight of the support assembly overcomes the force which holds the clamp open. The ring members are selectively manipulatable to overcome the bias to move them to closed position for insertion of the conduit between and within the ring members.

The ring members or other means for holding the conduit are mounted in the frame member such that relative rotation is allowed between frame member and the holding means around a horizontal axis perpendicular to the axis of the conduit.

In operation of the apparatus, the apparatus with the leg members in a retracted position is lowered to the desired location on the seabed by means of a cable or chain system extending from a work barge or platform, or the like. The apparatus is positioned relative to the pipeline or conduit already installed on the seabed, such that the legs of the apparatus straddle the pipeline or conduit, while the holding means of the apparatus are kept in an open position. As the apparatus is placed on the conduit or pipeline section the holding means are closed under the weight of the apparatus, and are locked in place by diver or remote operated vehicle. Thereafter, each of the leg members are activated individually to expand or retract same relative to the frame and the seabed to the desired position.

The rotation between the holding means and the frame will allow the frame and leg members to maintain a vertical position while the holding means adapts to the slope of the conduit.

One of the legs may be placed in a slightly expanded position while another of the legs of the apparatus is moved in the opposite direction to accommodate a correction in slope of the seabed immediate the position of the apparatus. By repeating this procedure with several apparatus extended across the seabed, a considerable length of pipeline may be extended along the length of the seabed such that its entire contour conforms to the overall contour of the seabed without adverse interference by undulations and other irregularities in the seabed contour.

DESCRIPTION OF THE DRAWINGS

FIG. 2 is a detailed view of the apparatus of the present invention prior insertion of a conduit section therein.

FIG. 3 is a view similar of that of FIG. 2 illustrating the apparatus with a conduit member secured therein.

FIG. 4. is a view of the invention similar to that as shown in FIG. 3 with the apparatus expanded by the use of a remotely operated vehicle.

DESCRIPTION OF THE PREFERRED EMBODIMENTS

Figure 1:
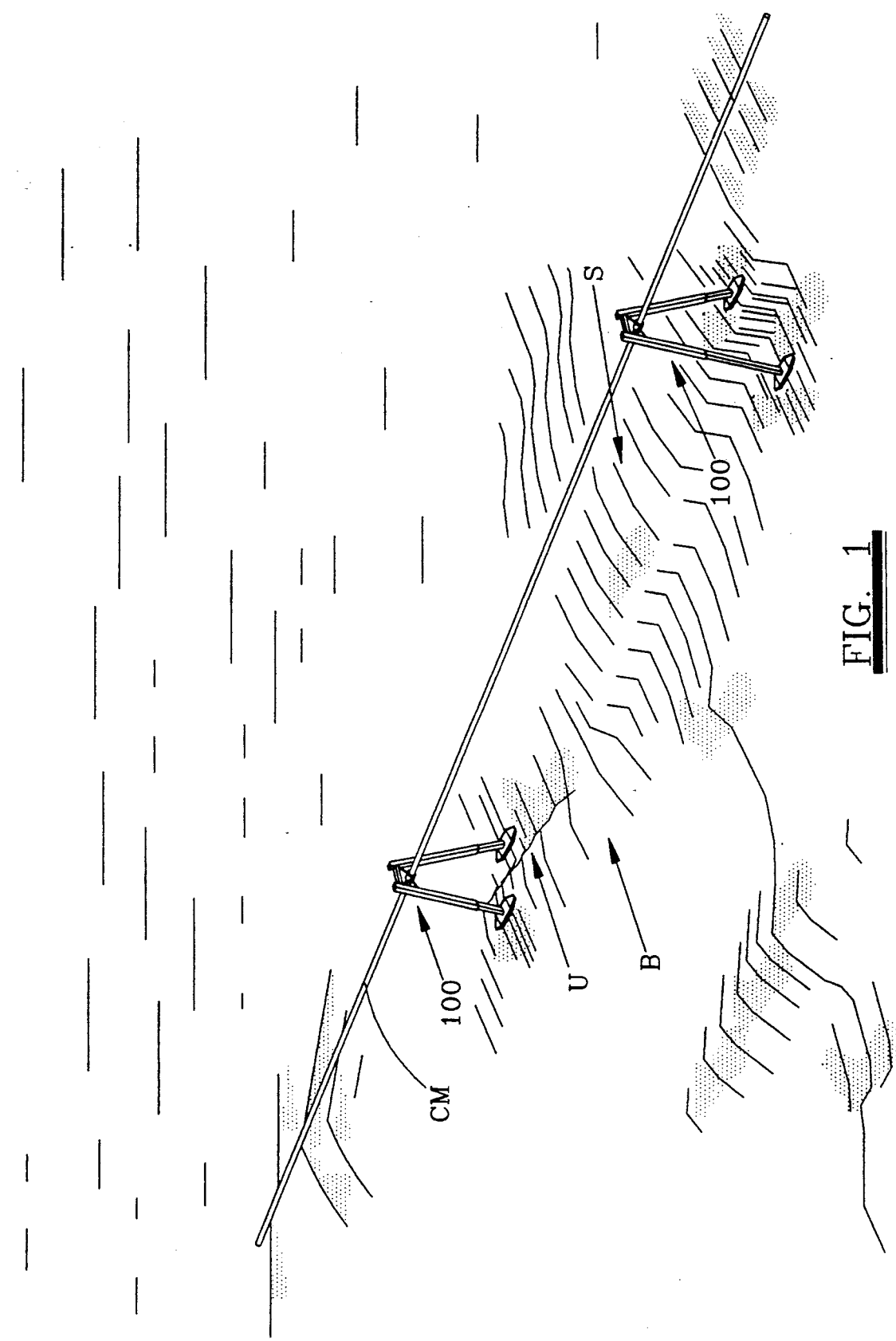
FIG. 1 is a schematic illustration of a subsea conduit, or a pipeline, incorporating the support apparatus of the present invention.

Now referring to FIG. 1, a series of seabed conduits support apparatuses 100 are shown disposed along a seabed B having undulations U and slopes S. A conduit member CM of a subsea pipeline is shown positioned within each of the apparatuses 100 to overcome such undulations U and slopes S defined and provide a substantially uniform support to the pipeline across the Seabed B. B Now referring to FIG. 2, the apparatus 100 includes a frame 101 having sleeves 102 and 103 thereon for receipt of respective leg members 104 and 109, which extend above and below the frame 101. The leg members 104, 109 move within the sleeves 102 and 103, with each of the members 104, 109 having pod-like shoes at the lower-most end thereof for stabilizing placement of the members 104, 109 on the seabed S.

A clamp assembly 113 is positioned on the frame 101 and has first and second ring elements 113A, 113B which are biased by a spring element to opened position. The rings 113A, 113B may be caused to overcome the bias to move the members 113A, 113B to the closed position, by applying the weight of the apparatus 100 as it is placed on the conduit C. The clamp assembly 113 is rotatably secured to the frame 101 to permit relative rotation between the frame 101 and the assembly 113 around a horizontal axis perpendicular to the axis of the conduit.

Subsequently, after the ring members 113A, 113B are urged to the closed position clamp or lock 113, such as a swage or screw-like system, is operated by the diver or the remotely operated vehicle to lock the rings 113A, 113B in the Closed position around the conduit C. Thereafter, accommodation and correction of the undulation or other irregularity in the seabed S is accomplished by selectively expanding or retracting the leg members 104 and 109 relative to the sleeves 102 and 103 so that the conduit is placed at the desired elevation and alignment relative to the seabed. This is effected by manipulating the winch 107, 111, with a drum 107A, 111A, around which a cable 108, 112 is wrapped, which cable 108, 112 is secured at the lower-most end of the respective leg members 104, 109, and the upper-most end of the respective leg members 104, 109, to manipulate the respective cable 108, 112, to cause selective telescopic movements between the respective leg members and the sleeves 102, 103.

Upon proper positioning of the apparatus 100, as described, a bolt 117 may be placed in one of many locking holes 115, 116, spaced along the length of the respective members 102, 103, to lock the leg members to the desired position.

Figure 5:
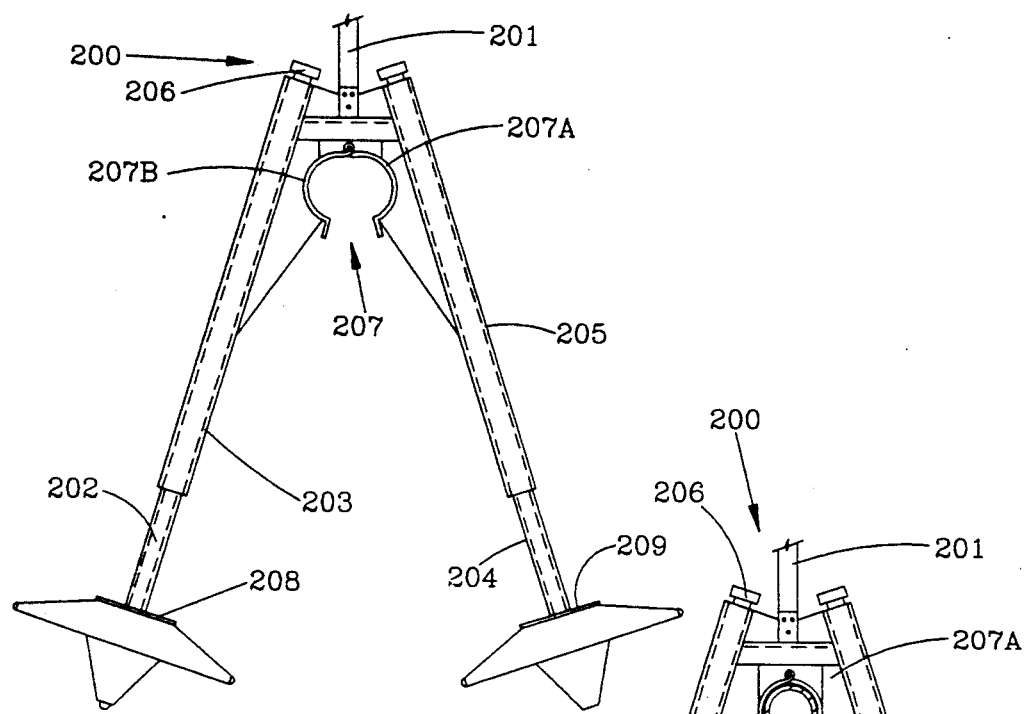
FIG. 5 is a view of another alternative preferred embodiment of the present invention in retracted position and without a conduit placed therein.
Figure 6:
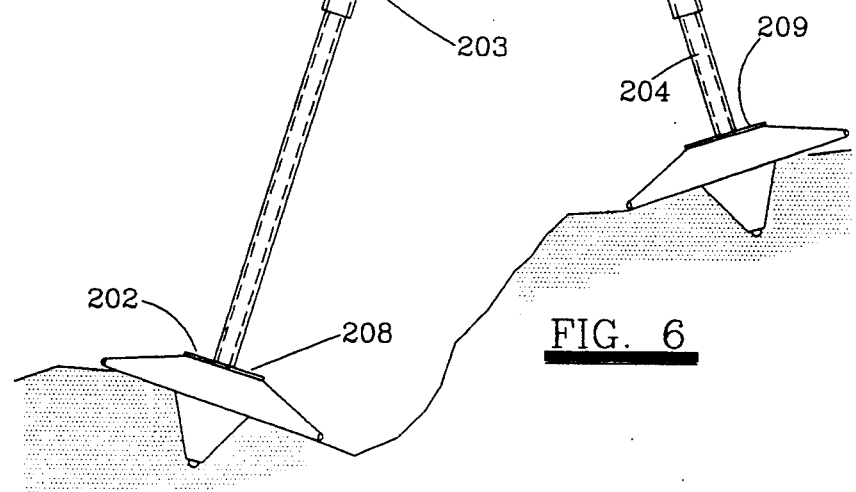
FIG. 6 is a view of the alternative embodiment of the present invention as shown in FIG. 5, but in expanded position with a conduit member held therein.

Now referring to FIGS. 5 and 6, an alternative apparatus 200 is illustrated having a lifting frame 201 and hydraulic torque wrench system schematically illustrated at 206 at the upper-most end of an outer leg member 203. The outer leg member 203 telescopically receives the inner extendable leg 202 having pod 208 at its lower-most end. Similarly, a second leg member consists of outer leg element 205 and inner telescopically received leg element 204, also having a lower pod 209 thereon. A clamp assembly 207 is provided, similar to that of the apparatus 100, illustrated as clamp assembly 113 in FIGS. 3 and 4. The clamp assembly 207 has first and second ring elements 207A, 207B, and a connector 207C to lock both ring elements.

Again, the clamp assembly 207 is secured to the frame 201 to permit relative rotational movement therebetween.

When it is desired to manipulate the legs of the apparatus 200, hydraulic pressure is applied to or removed from the hydraulic torque wrench 206 through a line (not shown) extending from the wrench 206 to the top of the water body, and to a barge, ship, or the like, having control mechanisms thereon, or to a hydraulic power source located underwater near the apparatus. The torque wrench 206 drives a screw jack mechanism connecting the inner and outer leg members such that application of the torque thereon causes expansion or retraction of the leg members relative to one another, thereby permitting movements of the leg members and proper positioning of the apparatus 200 and the conduit C relative to the seabed S.

Although the invention has been shown and described in terms of preferred embodiments, it will be appreciated by those skilled in the art that alternative embodiments and operating techniques are readily apparent. Accordingly, modifications are contemplated without departing from the spirit of the appended claims herein. For example, the apparatus may be provided with frames having extended therefrom a single, dual, triple, or other legged support system. The clamping assembly may be locked by hydraulic means. A hydraulic cylinder and piston configuration may be provided for telescoping movements of the leg members. The leg members may also be self-locking, once they are placed in a desired position. Surface powered and controlled hydraulic power packs may be incorporated where hydraulic hose lines are connected to a premounted hydraulic drive on the frame or clamp assembly. Surface operated hydraulic motors or wrenching devices may be provided for mounting on the support apparatus to tighten clamp bolts and drive the leg elements into position, thereby permitting the remotely operated vehicle to be utilized for strictly observation purposes.

What is claimed and desired to be secured by Letters Patent is:

1. A subsea conduit support apparatus, positionable upon a seabed comprising: a frame member; a plurality of legs extending to the seabed for supporting said frame member and having leg members selectively moveable to complementarily position said frame member relative to the contour of the seabed; and means carried by said frame member for holding said conduit within said apparatus, said leg members comprising first and second selectively expanded and retractable telescopically housed elements, said apparatus further comprising activating means carried by said leg members for selective telescopic movements between said first and second elements, said activating means comprising a cable secured to each end of said leg members, said cable passing around a drum, said drum being rotatable by a winch, whereby said drum is rotated by said winch to move said cable to expand or retract said leg members.

2. A subsea conduit support apparatus, comprising: a frame member; a plurality of legs extending to the seabed for supporting said frame member and having leg members selectively moveable to complementarily position said frame member relative to the contour of the seabed; and means carried by said frame member for holding said conduit within said apparatus, wherein the leg members comprise first and second selectively expanded and retractable telescopically housed elements, wherein said leg members include screw jack means responsive to hydraulic activation, whereby upon application of hydraulic pressure within said screw jack means, said screw jack means are rotated to correspondingly move said first and second leg member elements.

3. The method of supporting a subsea conduit along a seabed comprising the steps of:
  (a) providing a support apparatus comprising: a frame member; a plurality of leg members extending to the seabed for supporting said frame member and having leg members selectively moveable to position said frame members relative to the contour of the seabed; means carried by said frame member for holding said conduit within said apparatus; and activating means carried by said leg members for selective telescopic movements between said first and second elements, said activating means comprising a cable secured to each end of said leg member, said cable passing around a drum, said drum being rotatable by a winch, whereby said drum is rotated by said winch to move said cable to expand or retract said leg members;
  (b) placing said conduit within said holding means; and
  (c) manipulating said winch to rotate said drum to move the cable to expand or retract said leg members.

4. The method of supporting a subsea conduit along a seabed comprising the steps of:
  (a) providing a support apparatus comprising: a frame member; a plurality of leg members extending to the seabed for supporting said frame member and having leg members selectively moveable to position said frame members relative to the contour of the seabed; means carried by said frame member for holding said conduit within said apparatus; and activating means carried by said leg members for selective telescopic movements between said first and second elements, said activating means including screw jack means responsive to hydraulic activation, whereby upon application of hydraulic pressure within said screw jack means, said screw jack means are rotated to correspondingly move said leg members;
  (b) placing said conduit within said holding means; and
  (c) manipulating said screw jack means by applying hydraulic pressure therein to expand or retract said leg members.

* * * * *